US010287965B2

(12) United States Patent
Spenny (10) Patent No.: US 10,287,965 B2
(45) Date of Patent: May 14, 2019

(54) WAX THERMOSTAT (71) Applicant: DENSO International America, Inc., Southfield, MI (US)

(72) Inventor: Jason Spenny, Berkley, MI (US)

(73) Assignee: DENSO International America, Inc., Southfield, MI (US)

( * ) Notice: Subject to any disclaimer, the term of this patent is extended or adjusted under 35 U.S.C. 154(b) by 369 days.

(21) Appl. No.: 15/079,648

(22) Filed: Mar. 24, 2016

(65) Prior Publication Data
US 2017/0276056 A1 Sep. 28, 2017

(51) Int. Cl.
*F01P 7/16* (2006.01)
*G05D 23/02* (2006.01)
(52) U.S. Cl.
CPC .............. *F01P 7/16* (2013.01); *G05D 23/022* (2013.01); *G05D 23/02* (2013.01); *G05D 23/021* (2013.01)
(58) Field of Classification Search
CPC .......... F01P 7/16; G05D 23/02; G05D 23/022
See application file for complete search history.

(56) References Cited

U.S. PATENT DOCUMENTS

| 6,867,395 B2 | 3/2005 | Santanam |
| 2004/0074894 A1* | 4/2004 | Santanam ............... F01P 7/167 219/494 |
| 2008/0001405 A1* | 1/2008 | Gey ...................... F16L 19/061 285/354 |

FOREIGN PATENT DOCUMENTS

| GB | 1225102 A | 3/1971 |
| JP | 2001342833 A | 12/2001 |

* cited by examiner

*Primary Examiner* — Keith M Raymond
*Assistant Examiner* — Nael N Babaa
(74) *Attorney, Agent, or Firm* — Harness, Dickey & Pierce, P.L.C.

(57) ABSTRACT

A wax motor thermostat for an engine cooling system. The thermostat includes a cylinder having at least a first wax portion and a second wax portion each configured to expand at different temperatures. A piston is movable in response to expansion of the first and second wax portions to move the wax motor thermostat from a closed position to a fully open position or a partially open position between the closed and fully open positions to allow coolant to flow through the wax motor thermostat.

11 Claims, 6 Drawing Sheets

WAX THERMOSTAT

FIELD

The present disclosure relates to a wax thermostat, such as a wax thermostat for variable flow of engine coolant therethrough.

BACKGROUND

This section provides background information related to the present disclosure, which is not necessarily prior art.

Engine cooling systems for automobiles often use a wax motor thermostat to open and close a radiator coolant loop to control engine warmup and cooling. Such a wax motor thermostat is typically an on/off valve with a single set point that can cause rapid thermal cycling of the radiator, which may subject the radiator to undesirable stress. Having a single set point provides no control of coolant flowrate for light to moderate loads, which may lead to "hunting" in which the thermostat opens and closes as it tries to maintain equilibrium. It would therefore be desirable to have an improved thermostat that can be held partially open at various opening amounts at different temperatures, so as to avoid severe "hunting" and to avoid sending a large amount of very hot coolant to the radiator. This will advantageously reduce thermal shock on the radiator and other components, as well as provide a cost efficient way to control engine temperature without the need for sensors or control logic.

SUMMARY

This section provides a general summary of the disclosure, and is not a comprehensive disclosure of its full scope or all of its features.

The present teachings provide for a wax motor thermostat for an engine cooling system. The thermostat includes a cylinder having at least a first wax portion and a second wax portion each configured to expand at different temperatures. A piston is movable in response to expansion of the first and second wax portions to move the wax motor thermostat from a closed position to a fully open position or a partially open position between the closed and fully open positions to allow coolant to flow through the wax motor thermostat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
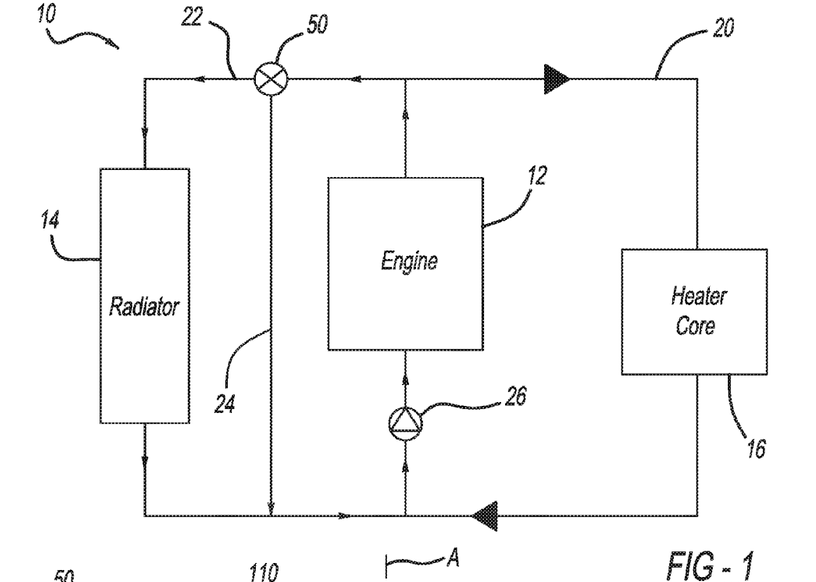
FIG. 1 illustrates a cooling system including a wax motor thermostat according to the present teachings.

With initial reference to FIG. 1, an engine cooling system according to the present teachings is illustrated at reference numeral 10. The engine cooling system 10 can be used with any suitable vehicle, such as any suitable passenger vehicle, mass transit vehicle, military vehicle, watercraft, aircraft, locomotive, construction vehicle, mining equipment, or any other suitable vehicle. Although the engine cooling system 10 is described herein as a vehicle engine cooling system, the engine cooling system 10 can be used to cool any suitable engine or motor, such as a generator, a building HVAC system, or any other suitable device, for example.

The engine cooling system 10 generally includes an engine 12, a radiator 14, and a heater core 16. The engine 12 can be an internal combustion engine, or any other suitable engine. The radiator 14 can be any suitable heat exchanger configured to cool coolant passing therethrough. The heater core 16 can be any suitable heater core configured to, for example, heat a vehicle passenger cabin.

Extending from the engine 12 to the heater core 16, and back to the engine 12, is a heater core loop 20. The heater core loop 20 can include any suitable conduit, such as any suitable pipe or hose, configured to transport coolant from the engine 12 to the heater core 16, and back to the engine 12. Extending from the engine 12 to the radiator 14 and back to the engine 12 is a radiator coolant loop 22. The radiator coolant loop 22 can be any suitable conduit, such as any suitable pipe or hose, configured to transport coolant from the engine 12 to the radiator 14, and back to the engine 12. The radiator coolant loop 22 includes a bypass loop 24, which transports coolant from the engine 12 back to the engine 12 without passing through the radiator 14. Coolant is pumped through the engine cooling system 10 by any suitable pump 26. The pump 26 can be arranged at any suitable location, such as upstream of the engine 12. A wax motor thermostat 50 according to the present teachings is arranged along the radiator coolant loop 22, and is configured to regulate the amount of coolant passing from the engine 12 to the radiator 14, as well as through the bypass loop 24.

During operation of the engine cooling system 10, the pump 26 pumps coolant through the engine 12, which heats the coolant. A portion of the heated coolant passes from the engine 12 to the heater core loop 20, which directs heated coolant to the heater core 16 to heat the passenger cabin. The heater core 16 includes any suitable heat exchanger, and thus coolant passing from the heater core 16 back to the engine 12 is of a reduced temperature and can again cool the engine 12.

A portion of the heated coolant is directed to the wax motor thermostat 50. When the wax motor thermostat 50 is closed, the heated coolant from the engine 12 is directed to the bypass loop 24, so as to bypass the radiator 14 and flow back to the engine 12. When the wax motor thermostat 50 is in a fully open position, heated coolant from the engine 12 does not flow through the bypass loop 24, but instead flows through the radiator coolant loop 22 to the radiator 14. At the radiator 14, the heated coolant is cooled, and then directed back to the engine 12 to again cool the engine.

The present teachings advantageously provide for positioning the wax motor thermostat 50 in a partially open position so as to direct a first portion of the coolant to the radiator 14 at a reduced rate as compared to when the wax motor thermostat 50 is fully open, and a second portion of coolant to flow through the bypass loop 24. Thus on a cold day, when a cold start of the engine 12 is performed, the amount of cold coolant passing from the engine 12 to the radiator 14 can be reduced and regulated so as to reduce stress on the radiator 14 and the tubes of the radiator coolant loop 22. When the temperature of the engine 12 and the coolant exiting therefrom is below a predetermined temperature, such as about 90°, such as 88°, it is advantageous to maintain the wax motor thermostat 50 in a closed position so as to direct coolant through the bypass loop 24 and not through the radiator 14. Once the coolant exiting the engine 12 is heated to about 90°, such as 92°, it is advantageous to open the wax motor thermostat 50 in order to direct coolant through the radiator 14.

As the temperature of the coolant exiting the engine 12 increases, it is advantageous to gradually open the wax thermostat 50. This is because rapidly increasing the volume of hot coolant to the radiator 14, thereby rapidly increasing the temperature of the radiator 14, can cause undesirable stress on the radiator 14 and the tubes of the radiator coolant loop 22 conducting coolant to and from the radiator 14. Gradually opening the wax motor thermostat 50 will reduce the thermal shock to the radiator 14 and the radiator coolant loop 22, thereby prolonging the life span thereof. Furthermore, configuring the wax motor thermostat 50 in accordance with the present teachings so that the thermostat 50 can gradually open and close prevents the thermostat 50 from repeatedly opening and closing in an effort to reach equilibrium, also known as "hunting." The present teachings thus advantageously provide an inexpensive way for controlling temperature of the engine 12 without having to install complex and costly sensors or control logic. As described herein, the thermostat 50 can open to various different degrees at different temperatures to avoid severe hunting and to avoid sending a large volume of very hot coolant to the radiator 14. This significantly reduces any thermal shock to the radiator 14, the radiator coolant loop 22, and other associated components.

With continued reference to FIG. 1, and additional reference to FIGS. 2A-2E, an exemplary wax motor thermostat according to the present teachings is illustrated at reference numeral 50. The wax motor thermostat 50 includes a cylinder 52 including an inner wall 54. Seated within the cylinder 52 is a piston base 58. The piston 56 extends out from within the cylinder 52 through an O-ring, and specifically an aperture 62 defined by the O-ring 60.

Figure 2A:
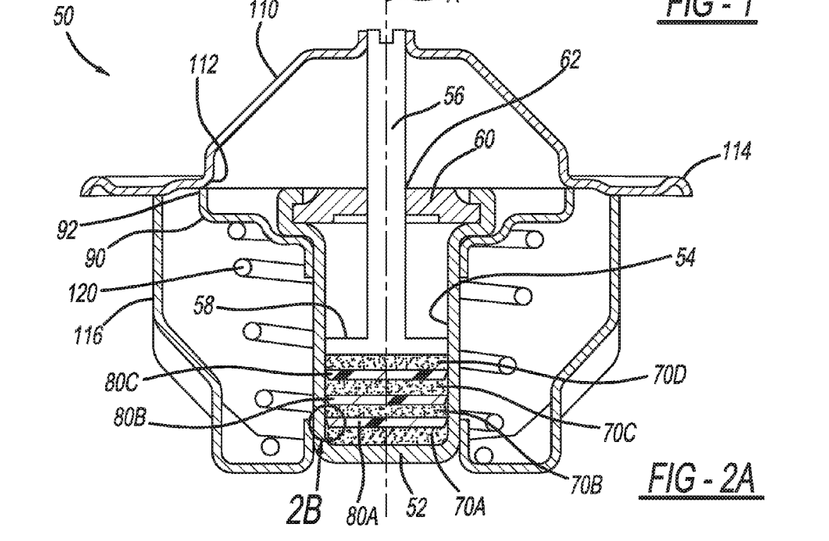
FIG. 2A is a cross-sectional view of an exemplary wax motor thermostat according to the present teachings in a closed position.

Seated within the cylinder 52 is a plurality of wax portions 70A-70D. Any suitable number of wax portions can be included, such as the four wax portions 70A-70D. The wax portions 70A-70D can include any suitable wax material configured to melt and expand at a particular temperature, with each one of the wax portions 70A-70D configured to melt and expand at different temperatures. For example, the first wax portion 70A, which is seated at the bottom of the cylinder 52, is configured to melt and expand at a lower temperature as compared to the second wax portion 70B, the third wax portion 70C, and the fourth wax portion 70D. The second wax portion 70B is configured to melt and expand at a higher temperature than the first wax portion 70A is, but at a temperature that is less than the temperatures that each one of the third wax portion 70C and the fourth wax portion 70D are configured to melt and expand at. The third wax portion 70C melts and expands at a temperature greater than the temperatures of the first and second wax portions 70A and 70B, but less than that of the fourth wax portion 70D. The fourth wax portion 70D is configured to melt and expand at a temperature greater than each of the first, second, and third wax portions 70A, 70B, and 70C.

A first washer 80A is between, and thus separates, the first wax portion 70A from the second wax portion 70B. Between the second wax portion 70B and the third wax portion 70C is a second washer 80B. Between the third wax portion 70C and the fourth wax portion 70D is a third washer 80C. The washers 80A-80C advantageously prevent the wax portions 70A-70D from mixing, particularly when melted in response to heated coolant passing around the cylinder 52.

Figures 2B, 2C, 2D:
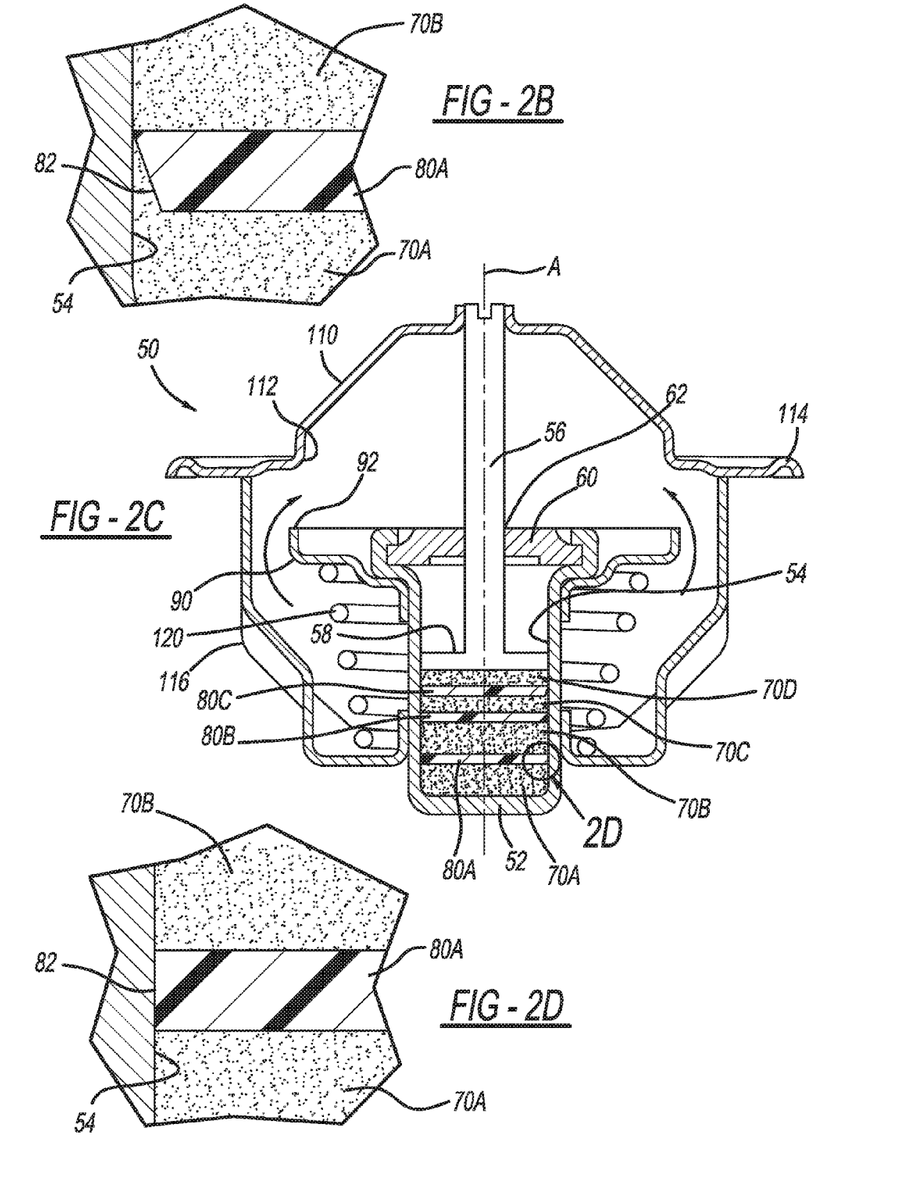
FIG. 2B shows area 2B of FIG. 2A.
FIG. 2C illustrates the wax motor thermostat of FIG. 2A in a partially open position.
FIG. 2D shows area 2D of FIG. 2C.

The washers 80A-80C are made of any suitable material configured to expand when heated to a predetermined temperature, which is typically at or less than the temperature that the first wax portion 70A is configured to melt at. The washers 80A-80C can be made of any suitable material, such as any suitable polymeric material, such as acetal. Each one of the first, second, and third washers 80A, 80B, and 80C includes a tapered edge 82 at an outer diameter thereof, as illustrated in FIG. 2B for example. The washers 80A-80C are arranged within the cylinder 52 such that the tapered edges 82 contact the inner wall 54 of the cylinder 52.

When the washers 80A-80C expand, the washers 80A-80C expand outward from a longitudinal axis A of the cylinder 52 and thus expand into the inner wall 54 so as to more securely engage the inner wall 54. For example, the tapered edges 82 deform against the inner wall 54 as the washers 80A-80C expand against the inner wall 54, as illustrated in FIG. 2D. Operation of the wax portions 70A-70D to open and close the wax motor thermostat 50 will be described further herein.

The wax motor thermostat 50 further includes a valve plate 90 extending outward from the cylinder 52. The valve plate 90 includes a valve seat 92. In the closed position of FIG. 2A, a first frame 110 is seated on the valve seat 92 so as to close the wax motor thermostat 50. Extending outward from the first frame 110 is a flange 114. The first frame 110 is coupled to the piston 56 so as to be actuated by the piston 56 as the piston 56 moves along the longitudinal axis A. Extending from the first frame 110, generally from the flange 114, is a second frame 116. The second frame 116 extends to the cylinder 52 and slidably moves vertically about the cylinder 52 as the piston 56 moves the first frame 110. A spring 120 biases the wax motor thermostat 50 in the closed position of FIG. 2A.

Operation of the wax motor thermostat 50 will now be described in detail. The wax motor thermostat 50 is arranged such that coolant from the engine 12 passes around an exterior of the cylinder 52. When the wax motor thermostat 50 is in the closed position of FIG. 2A, the engine coolant cannot pass through the wax motor thermostat 50, and is thus directed to the bypass loop 24 in its entirety. As the coolant exiting the engine 12 is warmed by the engine 12, the coolant warms the cylinder 52 and the wax portions 70A-70D, as well as the washers 80A-80C, seated therein.

At or prior to the first wax portion 70A reaching its melting point, the first, second, and third washers 80A-80C are heated so as to expand outward against the inner wall 54, thereby resulting in the tapered edges 82 of the first through third washers 80A-80C contacting and deforming against the inner wall 54 to provide an enhanced barrier between the first, second, and third wax portions 70A-70D (see FIG. 2D for example). The polymeric material of the washers 80A-80C is configured such that even after the washers 80A-80C expand against the inner wall 54, the washers 80A-80C can slide along the inner wall 54 in response to expansion of the wax portions 70A-70D.

With reference to FIG. 2C, when the coolant from the engine 12 heats the first wax portion 70A to its melting point, the first wax portion 70A will melt and expand, thereby pushing the washers 80A-80C and the wax portions 70B-70D upward along the longitudinal axis A, which pushes the piston 56 upward along the longitudinal axis A. As the piston 56 moves upward along the longitudinal axis A, the piston 56 lifts the first frame 110 off of the valve seat 92 so as to partially open the wax motor thermostat 50, thereby allowing a portion of the coolant to pass through the wax motor thermostat 50 to the radiator 14, while a majority of the coolant continues to flow through the bypass loop 24. FIG. 2C illustrates the wax motor thermostat 50 in a partially open position: the first wax portion 70A and the second wax portion 70B having melted, thereby raising the piston 56, which lifts the first frame 110 off of the valve seat 92.

Figure 2E:
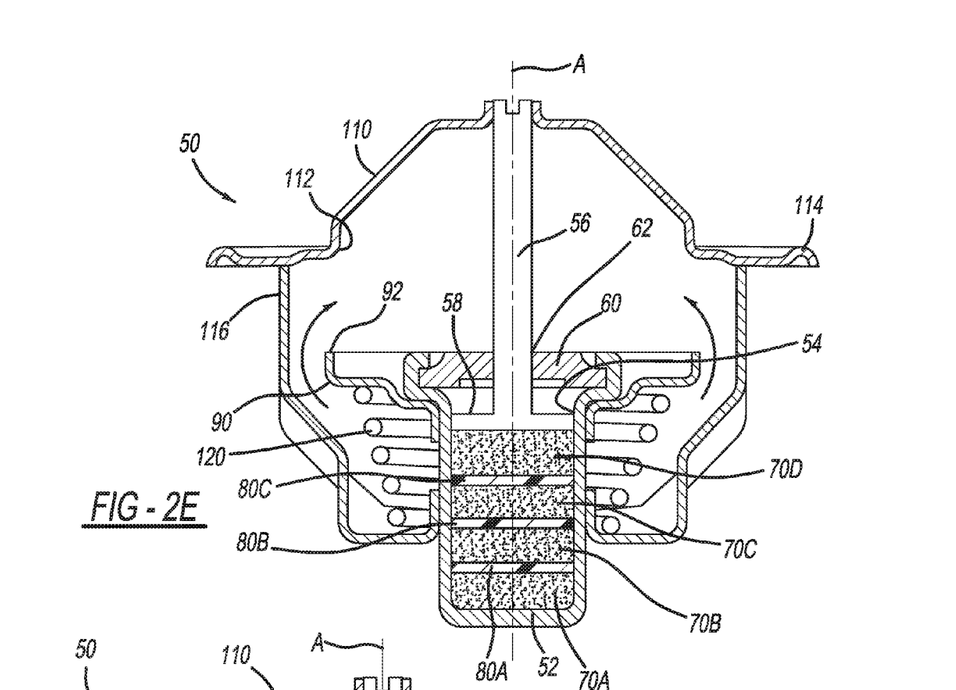
FIG. 2E illustrates the wax motor thermostat of FIG. 2E in a fully open position.

As the coolant from the engine 12 increases in temperature, the third wax portion 70C will melt when heated to its melting point, and subsequently the fourth wax portion 70D will melt when heated to its melting point. With reference to FIG. 2E, once all of the wax portions 70A-70D have melted, the piston 56 is pushed to its most extended position, thereby fully raising the first frame 110 off of the valve seat 92 so as to arrange the wax motor thermostat 50 in the fully open position of FIG. 2E. In the fully open position of FIG. 2E, the wax motor thermostat 50 directs all or substantially all of the engine coolant to the radiator 14, where heat is released from the coolant. When in the fully open position of FIG. 2E, most or all of the coolant flows through the wax motor thermostat 50 to the radiator 40.

Figure 3A:
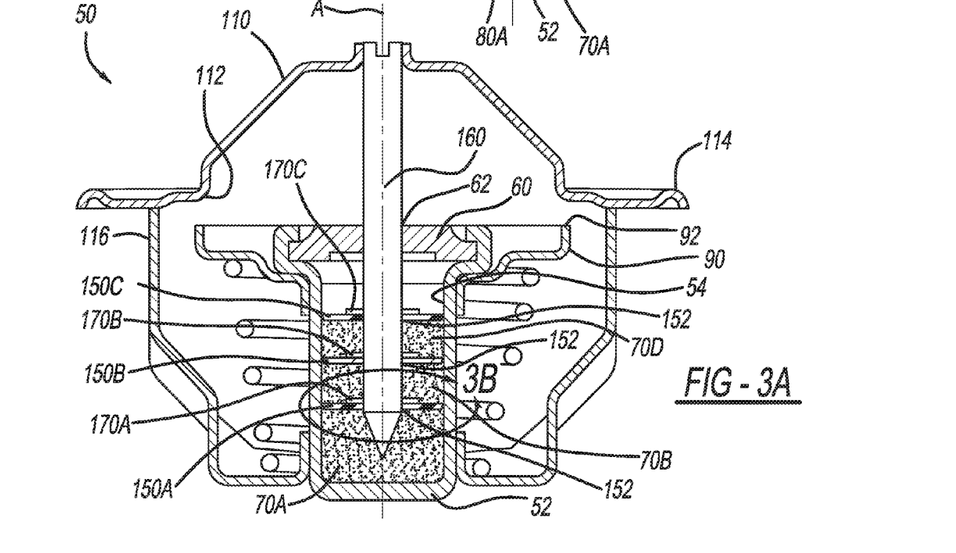
FIG. 3A is a cross-sectional view of another wax motor thermostat according to the present teachings in a partially open position.
Figure 3B:
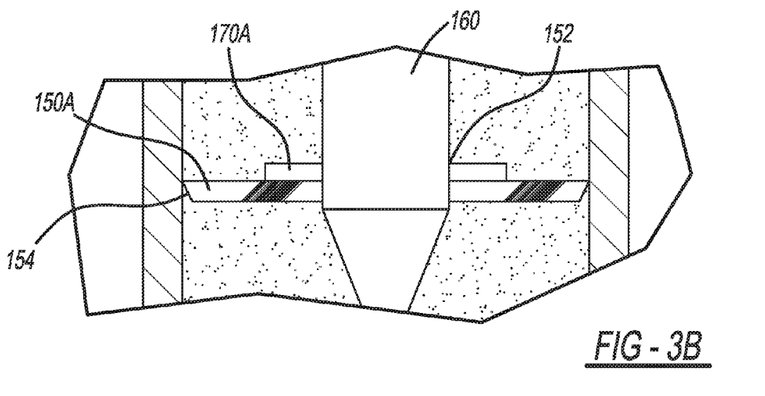
FIG. 3B shows area 3B of FIG. 3A.

FIGS. 3A and 3B illustrate the wax motor thermostat 50 with a modified first washer 150A, second washer 150B, and third washer 150C. The washers 150A-150C each define an aperture 152 at an axial center thereof. The apertures 152 are positioned such that the longitudinal axis A of the cylinder 52 extends through each one of the apertures 152. A modified piston 160, which like the piston 56 is coupled to the first frame 110, extends through each one of the apertures 152.

Extending outward from the piston 160 is a first barb 170A, a second barb 170B, and a third barb 170C. Each one of the barbs 170A-170C extend outward from different portions of the piston 160 along the length thereof. The first barb 170A is seated on the first washer 150A. The second barb 170B is seated on the second washer 150B. The third barb 170C is seated on the third washer 150C. Therefore, as the wax portions 70A-70C melt and move the washers 150A-150C along the longitudinal axis A, the washers 150A-150C push against the barbs 170A-170C to thereby move the piston 160 along the longitudinal axis A and raise the first frame 110 from the valve seat 92 in order to open the wax motor thermostat 50.

For example, and as illustrated in FIG. 3A, when the first wax portion 70A is heated to its melting point by warm coolant passing over the cylinder 52, the first wax portion 70A melts and expands, thereby pushing the first washer 150A upward along the longitudinal axis A and against the first barb 170A in order to move the piston 160 a first distance, which places the wax motor thermostat 50 in the partially open position of FIG. 3. Upon the second wax portion 70B being heated to its melting point, the second wax portion 70B melts and expands to push the second washer 150B against the second barb 170B, which further raises the piston 160 and further opens the wax motor thermostat 50. When the coolant heats the third wax portion 70C to its melting point, the third wax portion 70C melts and expands to push the third washer 150C against the third barb 170C, thereby further moving the piston 160 along the longitudinal axis A out from within the cylinder 52, and raising the first frame 110 off of the valve seat 92 in order to place the wax motor thermostat 50 in the fully open position (similar to the position of FIG. 2E).

Figure 4:
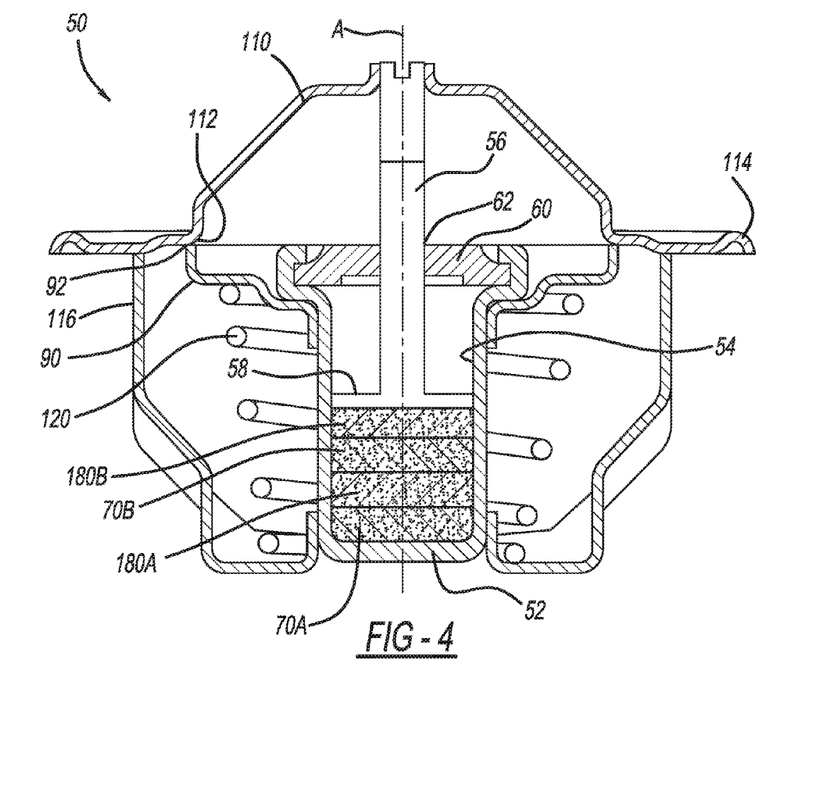
FIG. 4 is a cross-sectional view of an additional wax motor thermostat according to the present teachings in a closed position.

FIG. 4 illustrates the wax motor thermostat 50 with the washers 80A-80C replaced by wax barrier portions or layers, such as first wax barrier portion 180A and second wax barrier portion 180B. Although two wax barrier portions 180A and 180B are illustrated, any suitable number of wax barrier portions can be included, and any suitable number of wax portions 70 can be included. The first wax barrier portion 180A is between the first wax portion 70A and the second wax portion 70B. The second wax barrier portion 180B is on a side of the second wax portion 70B that is opposite to the first wax barrier portion 180A. The first and second wax barrier portions 180A and 180B each have a melting point that is higher than the highest melting point of the first and second wax portions 70A and 70B. The first and second wax barrier portions 180A and 180B advantageously separate the first and second wax portions 70A and 70B, and are not subject to melting under normal operating conditions of the engine cooling system 10.

Figure 5:
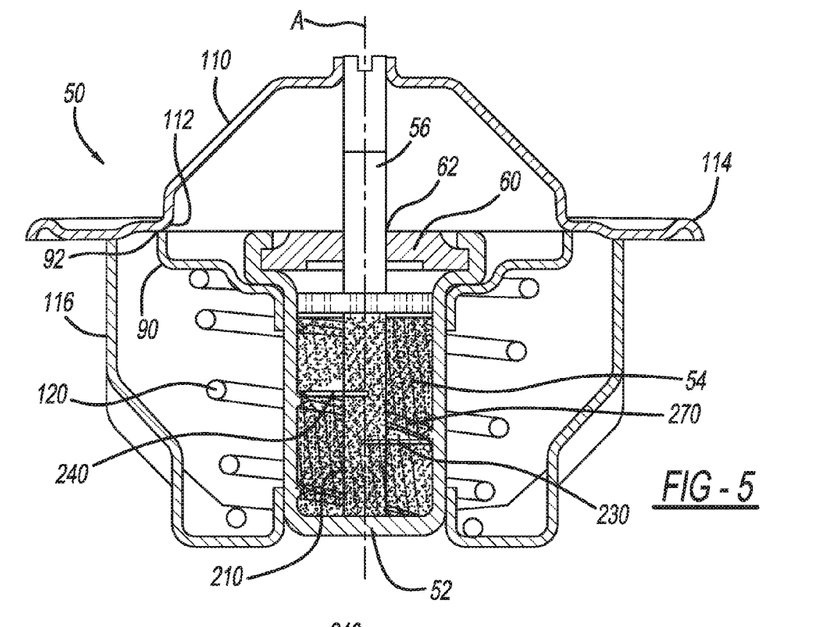
FIG. 5 is a cross-sectional view of another wax motor thermostat according to the present teachings.

With reference to FIG. 5, the wax motor thermostat 50 can include a center sleeve 210 arranged in the cylinder 52 in a manner configured to allow the center sleeve 210 to rotate about the longitudinal axis A. With continued reference to FIG. 5, and additional reference to FIGS. 6A-6C, a rigid wall 220 extends from the inner wall 54 of the cylinder 52 towards the center sleeve 210. The center sleeve 210 is arranged such that the longitudinal axis A extends through the center sleeve 210 and the center sleeve 210 is rotatable about the longitudinal axis A. The rigid wall 220 is stationary, and thus does not rotate with the center sleeve 210.

Extending outward from the center sleeve 210 is a first movable or rotatable wall 230, and a second movable or rotatable wall 240. Each one of the first and second movable walls 230 and 240 is mounted to the center sleeve 210 such that rotational movement of the first and/or second movable walls 230 and 240 rotates the center sleeve 210. The first and second movable walls 230 and 240 extend outward from the center sleeve 210 towards and to, or nearly to, the inner wall 54. Extending from the inner wall 54 of the cylinder 52 is a tab 250. In the closed position of FIG. 6A, the tab 250 prevents the second movable wall 240 from rotating counterclockwise past the tab 250. A torsional spring is included to bias the center sleeve 210 to the closed position of FIGS. 5 and 6A.

Figure 6A:
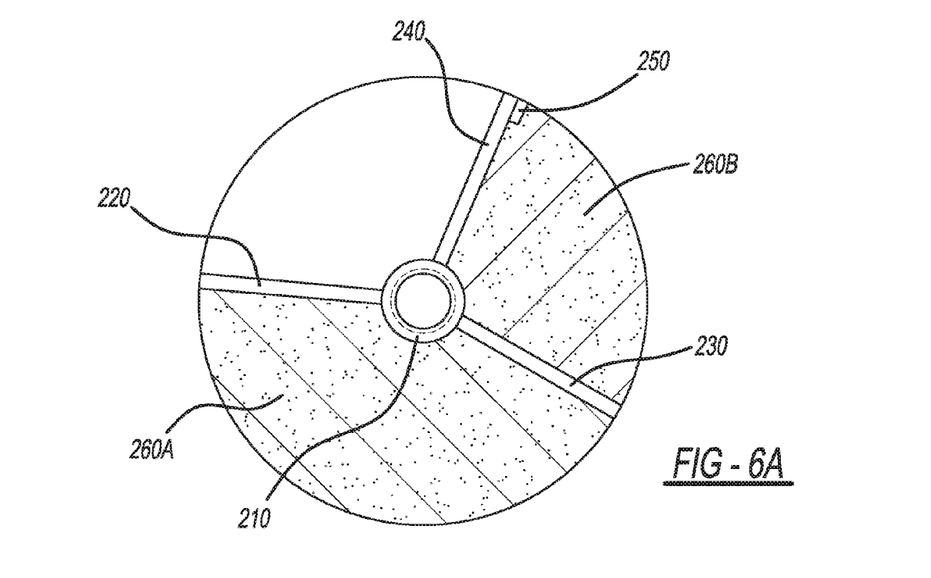
FIG. 6A is a cross-sectional view of a cylinder of the wax motor thermostat of FIG. 5, the wax motor thermostat in a closed configuration.
Figure 6B:
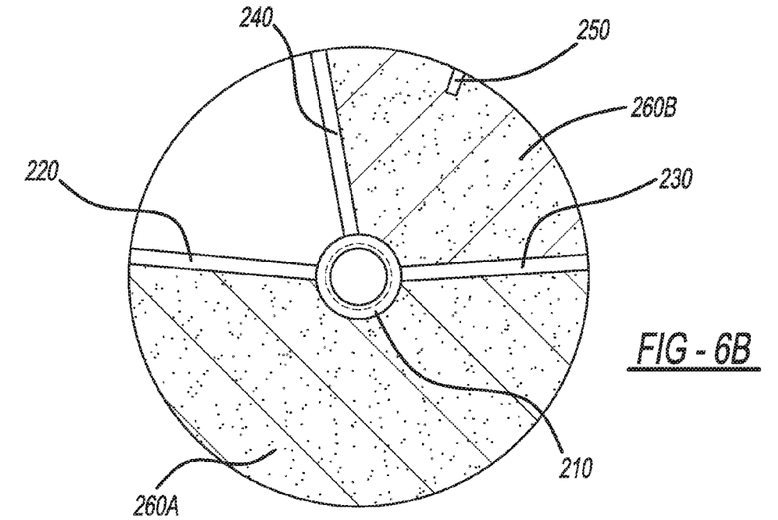
FIG. 6B is a cross-sectional view of the cylinder of the wax motor thermostat of FIG. 5 in a partially open configuration.
Figure 6C:
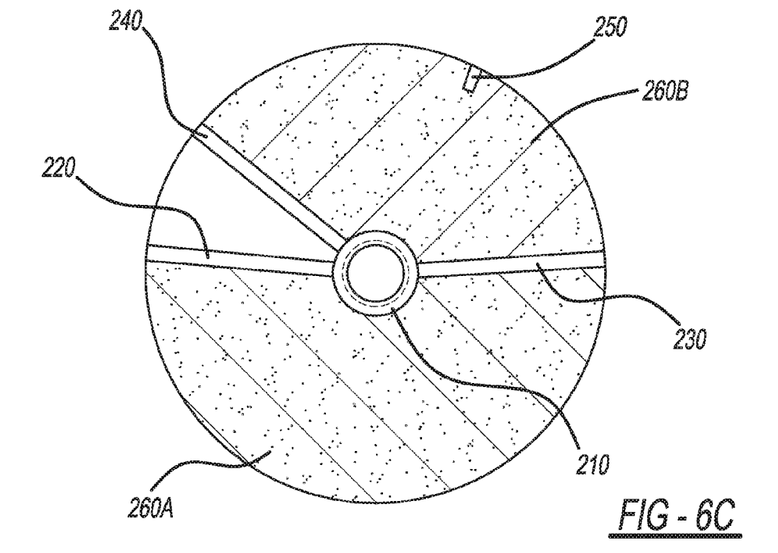
FIG. 6C is a cross-sectional view of the cylinder of the wax motor thermostat of FIG. 5 in an open configuration.

The center sleeve 210 includes internal threads, which are configured to cooperate with threads of the piston, such that rotation of the center sleeve 210 moves the piston along the longitudinal axis A, thereby moving the wax motor thermostat 50 from the closed position of FIGS. 5 and 6A to a partially open position similar to that of FIG. 3, and to a fully open position similar to that of FIG. 4. FIGS. 6B and 6C illustrate the partially open and fully open positions respectively, and will be described further herein.

Arranged between the rigid wall 220 and the first movable wall 230 is a first wax portion 260A. A second wax portion 260B is arranged between the first movable wall 230 and the second movable wall 240. The first and second wax portions 260A and 260B are seated on a support surface 270. The first and second wax portions 260A and 260B are substantially the same as the wax portions 70A-70D. The first wax portion 260A is configured in any suitable manner to have a first melting point. The second wax portion 260B is configured in any suitable manner to have a second melting point that is higher than the first melting point of the first wax portion 260A.

When the cylinder 52 and the first wax portion 260A thereof are heated by the coolant exiting the engine 12 to a temperature sufficient to melt the first wax portion 260A, the first wax portion 260A melts and expands, and pushes against the rigid wall 220 and the first movable wall 230. Because the rigid wall 220 is rigidly mounted to the inner wall 54 of the cylinder 52, the rigid wall 220 will not move. The first movable wall 230 will move, however, in response to being pushed by the first wax portion 260A. The first wax portion 260A pushes the first movable wall 230 counterclockwise in the example illustrated, thereby rotating the center sleeve 210 in a counterclockwise direction. The threaded connection between the center sleeve 210 and the piston 56 is configured such that counterclockwise rotation of the center sleeve 210 moves the piston 56 along the longitudinal axis A, thereby raising the first frame 110 off of the valve seat 92 in order to move the wax motor thermostat 50 from the closed position to the partially open position, as illustrated in FIG. 6B.

With reference to FIG. 6C, when the second wax portion 260B is heated to its melting point by coolant flowing past the cylinder 52, the second wax portion 260B will melt and expand to push against the first movable wall 230 and the second movable wall 240. The melted and expanded first wax portion 260A prevents the first movable wall 230 from rotating clockwise, and thus supports the first movable wall 230 in the position illustrated in FIG. 6B. In response to being pushed by the second wax portion 260B, the second movable wall 240 rotates counterclockwise to the position of FIG. 6C, and thus rotates the center sleeve 210 counterclockwise (the first and second movable walls 230 and 240 are individually movable to independently rotate the center sleeve 210) in order to further move the piston along the longitudinal axis and arrange the wax motor thermostat 50 in the fully open position, similar to that illustrated in FIG. 2C.

The present teachings thus advantageously provide for a wax motor thermostat 50, such as for an engine cooling system, which is configured to be gradually opened as the temperature of coolant exiting the engine rises. This advantageously prevents an excessive amount of cold coolant from traveling to the radiator 14 during a cold engine start, which may damage the radiator 14 and/or components associated therewith, such as coolant tubes extending to and away from the radiator 14. Being able to gradually open and close the wax motor thermostat also advantageously eliminates excessive "hunting" during which the wax motor thermostat 50 undesirably opens and closes repeatedly. The present teachings thus provide a cost effective way for controlling engine temperature without the need to install complex and costly sensors and/or control logic.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully transport the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A wax motor thermostat for an engine cooling system comprising:
    a cylinder including at least a first wax portion and a second wax portion each configured to expand at different temperatures;
    a piston movable in response to expansion of the first and second wax portions to move the wax motor thermostat from a closed position to a fully open position, or to a partially open position between the closed and fully open positions, to allow coolant to flow through the wax motor thermostat; and
    a first washer between the first and second wax portions, and a second washer on a side of the second wax portion opposite to the first washer, each one of the first and the second washers having a tapered edge at an outer diameter thereof, the first and second washers are arranged within the cylinder such that both of the tapered edges contact an inner wall of the cylinder, wherein:
        each one of the first and second washers defines an aperture through which the piston extends;
        a first barb extends from the piston and is arranged opposite to the first washer such that movement of the first washer against the first barb in response to expansion of the first wax portion moves the piston a first distance and moves the wax motor thermostat to the partially open position; and
        a second barb extends from the piston and is arranged opposite to the second washer such that movement of the second washer against the second barb in response to expansion of the second wax portion moves the piston a second distance to the fully open position.

2. The wax motor thermostat of claim 1, further comprising a spring biased to maintain the wax motor in the closed position.

3. The wax motor thermostat of claim 1, further comprising a valve plate having a valve seat, the piston is configured to raise a frame off of the valve seat to move the wax motor thermostat from the closed position to the partially open position and the fully open position.

4. The wax motor thermostat of claim 1, wherein the first and the second wax portions are configured to melt as the wax expands.

5. The wax motor thermostat of claim 1, wherein each one of the first and second washers includes a polymeric material.

6. The wax motor thermostat of claim 1, wherein each one of the first and second washers includes acetal.

7. The wax motor thermostat of claim 1, wherein the tapered edges deform against the inner wall of the cylinder when the first and second washers are heated, and the tapered edges are slidably movable along the inner wall.

8. A wax motor thermostat for an engine cooling system comprising:
    a cylinder including at least a first wax portion and a second wax portion each configured to expand at different temperatures;
    a first washer between the first and the second wax portions, the first washer defining a first aperture;
    a second washer on a side of the second wax portion opposite to the first washer;
    a piston extending through the first aperture and the second aperture;
    a first barb extending from the piston and arranged opposite to the first washer; and
    a second barb extending from the piston and arranged opposite to the second washer;
    wherein the piston is movable in response to expansion of the first and second wax portions to move the wax motor thermostat from a closed position to a fully open position or a partially open position between the closed and fully open positions to allow coolant to flow through the wax motor thermostat.

9. The wax motor thermostat of claim 8, wherein:
    upon expansion of the first wax portion the first wax portion moves the first washer to apply force against the first barb to move the piston along a longitudinal axis of the cylinder and move the wax motor thermostat to the intermediate position; and
    upon expansion of the second wax portion subsequent to expansion of the first wax portion, the second wax portion moves the second washer to apply force against the second barb to move the piston along the longitudinal axis and move the wax motor thermostat to the intermediate positon.

10. The wax motor thermostat of claim 8, wherein the first and second wax portions are configured to melt as the wax expands.

11. The wax motor thermostat of claim 8, wherein:
    each one of the first and second washers has a tapered edge at an outer diameter thereof, the first and second washers are arranged within the cylinder such that both of the tapered edges contact an inner wall of the cylinder; and
    the tapered edges deform against the inner wall of the cylinder when the first and second washers are heated, and the tapered edges are slidably movable along the inner wall.

* * * * *

UNITED STATES PATENT AND TRADEMARK OFFICE
CERTIFICATE OF CORRECTION

| | | |
|---|---|---|
| PATENT NO. | : 10,287,965 B2 | |
| APPLICATION NO. | : 15/079648 | |
| DATED | : May 14, 2019 | |
| INVENTOR(S) | : Spenny | |

It is certified that error appears in the above-identified patent and that said Letters Patent is hereby corrected as shown below:

In the Claims

Column 10, Claim 9, Line 46, delete "positon." and insert --position.-- therefor Signed and Sealed this
Thirtieth Day of July, 2019

Andrei Iancu
*Director of the United States Patent and Trademark Office*